(12) United States Patent
Gadkaree et al.

(10) Patent No.: US 7,875,102 B2
(45) Date of Patent: Jan. 25, 2011

(54) METHOD FOR MANAGING THE USE OF FLOW-THROUGH MONOLITHIC SORBENTS FOR THE SORPTION OF A TRACE CONTAMINANT FROM A FLUID STREAM

(75) Inventors: Kishor Purushottam Gadkaree, Big Flats, NY (US); David Lathrop Morse, Corning, NY (US)

(73) Assignee: Corning Incorporated, Corning, NY (US)

( * ) Notice: Subject to any disclaimer, the term of this patent is extended or adjusted under 35 U.S.C. 154(b) by 271 days.

(21) Appl. No.: 12/080,350

(22) Filed: Apr. 2, 2008

(65) Prior Publication Data

US 2009/0249954 A1    Oct. 8, 2009

(51) Int. Cl.
*B01D 53/06* (2006.01)
(52) U.S. Cl. .............................. 95/107; 95/116; 95/134; 422/177; 422/178; 428/593
(58) Field of Classification Search .................. 95/107, 95/116, 134; 422/177, 178; 428/593
See application file for complete search history.

(56) References Cited

U.S. PATENT DOCUMENTS

| | | | |
|---|---|---|---|
| 4,789,528 A | | 12/1988 | Owen et al. |
| 6,258,334 B1 * | | 7/2001 | Gadkaree et al. ............ 423/210 |
| 6,712,878 B2 | | 3/2004 | Chang et al. ..................... 53/4 |
| 2002/0076372 A1 | | 6/2002 | Leloup et al. ................... 53/34 |
| 2006/0048646 A1 * | | 3/2006 | Olson et al. .................... 95/134 |
| 2006/0057044 A1 | | 3/2006 | Chang et al. ................. 423/210 |
| 2007/0119053 A1 | | 5/2007 | Shimada et al. ................. 51/16 |
| 2007/0261557 A1 | | 11/2007 | Gadkaree et al. .................. 53/2 |
| 2007/0265161 A1 | | 11/2007 | Gadkaree et al. ............ 502/417 |

FOREIGN PATENT DOCUMENTS

| | | |
|---|---|---|
| WO | 99/16544 | 4/1999 |
| WO | WO 2004/104382 | 12/2004 |
| WO | WO 2005056165 A1 * | 6/2005 |
| WO | WO 2006/002041 | 1/2006 |

OTHER PUBLICATIONS

"Planning for Long-term Catalyst Healthcare", www.cormetech.com printed on Feb. 19, 2008.

(Continued)

*Primary Examiner*—Robert J Hill, Jr.
*Assistant Examiner*—Christopher P Jones
(74) *Attorney, Agent, or Firm*—Joseph M. Homa (57) ABSTRACT

A method for managing the use of flow-through monolithic sorbents for the sorption of a trace contaminant from a fluid stream, which comprises: providing two or more flow-through monolithic sorbents having a trace contaminant sorbed thereon, wherein the flow-through monolithic sorbents are positioned in an initial series to allow for passing a fluid stream from an upstream inlet end of the series to a downstream outlet end of the series; removing an inlet end portion of the flow-through monolithic sorbents from the inlet end position of the series; moving a downstream portion of the flow-through monolithic sorbents from a downstream position in the series to the inlet end position of the series; and placing a replacement flow-through monolithic sorbent portion in a downstream position of the series.

20 Claims, 4 Drawing Sheets

OTHER PUBLICATIONS

"Catalyst Layer Management" www.cormetech.com, printed on Feb. 19, 2008.

"In-Situ Catalyst Replacement", www.cormetech.com, printed on Feb. 19, 2008.

Patent abstracts of Japan, "Regenerating Method for Denitrating Catalyst", abstract of JP application No. 07-027722, filed Jan. 25, 1995.

Patent abstracts of Japan, "Projection Device for Regeneration Of Deteriorated Catalyst", abstract of JP application No. 11-141049, filed May 21, 1999.

Patent abstracts of Japan, "Method Of Purifying Silicon-Containing Exhaust Gas", abstract of JP application No. 2002-205765, filed Jul. 15, 2002.

Patent abstracts of Japan, "Method And Apparatus For Cleaning Exhaust Gas", abstract of JP application No. 09-355776, filed Dec. 24, 1997.

Patent abstracts of Japan, "Regeneration Of Oxidizing Catalyst", abstract of JP application No. 59-135188, filed Jul. 2, 1984.

Patent abstracts of Japan, "Recycling Of Denitration Catalyst", abstract of JP application No. 02-332612, filed Nov. 29, 1990.

Patent abstracts of Japan, "Regenerating Method Of Poisoned Denitration Catalyst by Rinsing", abstract of JP application No. 57-158011, filed Sep. 13, 1982.

Patent abstracts of Japan, "Reactivation Treatment Of Denitrated Catalyst", abstract of JP application No. 62-278598, filed Nov. 4, 1987.

Patent abstracts of Japan, "Method And Device For Regenerating Denox Catalyst", abstract of JP application No. 05-270627, filed Oct. 28, 1993.

Patent abstracts of Japan, "Regeneration Of Denitration Catalyst", abstract of JP application No. 62-236271, filed Sep. 22, 1987.

Patent abstracts of Japan, "Regeneration Of Denitration Catalyst", abstract of JP application No. 06-019100, filed Feb. 16, 1994.

Kapteijn, T.A., "New non-traditional multiphase catalytic reactors based on monolithic structures", Catalysis Today 66 (2001), p. 133-144.

* cited by examiner

METHOD FOR MANAGING THE USE OF FLOW-THROUGH MONOLITHIC SORBENTS FOR THE SORPTION OF A TRACE CONTAMINANT FROM A FLUID STREAM

FIELD OF THE DISCLOSURE

This disclosure relates to a method for managing the use of flow-through monolithic sorbents for the sorption of a trace contaminant, such as mercury, from a fluid stream.

BACKGROUND

Hazardous contaminant emissions have become environmental issues of increasing concern because of the dangers posed to human health. For instance, coal-fired power plants and medical waste incineration are major sources of human activity related mercury emission into the atmosphere. Elemental mercury and its variants, such as methylmercury, are global pollutants.

It has been reported that human inhalation of elemental mercury has acute effects on kidneys and the central nervous system (CNS), such as mild transient proteinuria, acute renal failure, tremors, irritability, insomnia, memory loss, neuromuscular changes, headaches, slowed sensory-motor nerve function, and reduction in cognitive function. Acute inhalation of elemental mercury can affect gastrointestinal and respiratory systems, causing chest pains, dyspnea, cough, pulmonary function impairment, and interstitial pneumonitis. Studies also indicate that chronic exposure to elemental mercury can cause adverse effects on kidneys and the CNS, including erethism (increased excitability), irritability, excessive shyness, insomnia, severe salivation, gingivitis, tremors, and the development of proteinuria.

The main route of human exposure to methylmercury is the diet, such as by eating fish. Acute exposure to methylmercury can cause CNS effects such as blindness, deafness, and impaired level of consciousness. Chronic exposure to methylmercury results in symptoms such as paresthesia (a sensation of prickling on the skin), blurred vision, malaise, speech difficulties, and constriction of the visual field.

It is estimated that there are 48 tons of mercury emitted from coal-fired power plants in the United States annually. One DOE-Energy Information Administration annual energy outlook projected that coal consumption for electricity generation will increase from 976 million tons in 2002 to 1,477 million tons in 2025 as the utilization of coal-fired generation capacity increases. However, mercury emission control regulations have not been rigorously enforced for coal-fired power plants. A major reason is a lack of effective control technologies available at a reasonable cost, especially for elemental mercury control.

A technology currently in use for controlling elemental mercury as well as oxidized mercury is activated carbon injection (ACI). The ACI process involves injecting activated carbon powder into a flue gas stream and using a fabric fiber or electrostatic precipitator to collect the activated carbon powder that has sorbed mercury. ACI technologies generally require a high C:Hg ratio to achieve the desired mercury removal level (>90%), which results in a high portion cost for sorbent material. The high C:Hg ratio indicates that ACI does not utilize the mercury sorption capacity of carbon powder efficiently.

An activated carbon packed bed can reach high mercury removal levels with more effective utilization of sorbent material. However, a typical powder or pellet packed bed has a very high pressure drop, which significantly reduces energy efficiency. Further, these fixed beds are generally an interruptive technology because they require frequent replacement of the sorbent material depending on the sorption capacity.

Activated carbon honeycombs disclosed in US 2007/0261557 may also be utilized to achieve high removal levels of trace contaminants such as toxic metals. A need still exists, however, for more effective utilization of such honeycombs, particularly in the context of system level designs for the removal of trace contaminants such as mercury from fluid streams.

More specifically, coal-fired power plants have limited available space for mercury remediation systems. Power plants also prefer to avoid maintenance of such systems between scheduled shut-downs, which typically occur once per year. A low maintenance, small-size mercury abatement reactor is therefore advantageous.

Although activated carbon honeycomb sorbents with high surface area and abundant sites for mercury sorption are useful, a substantial portion of a reactor comprising these honeycombs is often only partially filled with mercury when used for mercury sorption. For example, in laboratory experiments, only about one-third of the available honeycomb sorbent length in the reactor is essentially saturated after extensive use for mercury removal. The saturated portion of the honeycomb sorbent material in the reactor is located near the inlet of the honeycomb bed, with the remainder downstream often having only a very low concentration of mercury.

The inventors have discovered a method for managing the use of flow-through monolithic sorbents that leads to greater utilization of the sorbent material. Greater utilization of the sorbent material, in turn, leads to a reduction in the total volume of sorbents needed to achieve a desired level of trace contaminant removal, as well as a reduction in the cost of the trace contaminant removal system.

BRIEF DESCRIPTION OF THE DRAWINGS

The invention can be understood from the following detailed description either alone or together with the accompanying drawings. The drawings are included to provide a further understanding of the invention, and are incorporated in and constitute a part of this specification. The drawings illustrate one or more embodiments of the invention and together with the description serve to explain the principles and operation of the invention.

DESCRIPTION OF EMBODIMENTS OF THE INVENTION

One embodiment of the invention is a method for managing the use of flow-through monolithic sorbents for the sorption of a trace contaminant from a fluid stream, which comprises:

providing two or more flow-through monolithic sorbents having a trace contaminant sorbed thereon, wherein the flow-through monolithic sorbents are positioned in an initial series to allow for passing a fluid stream from an upstream inlet end of the series to a downstream outlet end of the series;

removing an inlet end portion of the flow-through monolithic sorbents from the inlet end position of the series;

moving a downstream portion of the flow-through monolithic sorbents from a downstream position in the series to the inlet end position of the series; and placing a replacement flow-through monolithic sorbent portion in a downstream position of the series.

Another embodiment of the invention is a method for managing the use of flow-through monolithic sorbents for the removal of a trace contaminant from a fluid stream, which comprises:

passing a fluid stream comprising a trace contaminant through an upstream inlet end of an initial series of two or more flow-through monolithic sorbents to a downstream outlet end of the series to sorb a trace contaminant in the series of flow-through monolithic sorbents; and periodically modifying the series of flow-through monolithic sorbents by a modification method comprising:

removing an inlet end portion of the flow-through monolithic sorbents from the inlet end position of the series;

moving a downstream portion of the flow-through monolithic sorbents from a downstream position in the series to the inlet end position of the series; and placing a replacement flow-through monolithic sorbent portion in a downstream position of the series.

Compared to ACI, the flow-through monolithic sorbents, such as honeycombs, utilize sorbent material more efficiently. In addition, the embodiments mentioned above represent a new system approach that can allow for maintaining high removal efficiency of a trace contaminant, such as a toxic metal like mercury, while reducing the total volume of flow-through monolithic sorbent material utilized for the sorption.

The invention may be used in the context of the sorption of any trace contaminant from a fluid stream. The fluid stream may be in the form of a gas or a liquid. The gas or liquid may also contain another phase, such as a solid particulate in either a gas or liquid stream, or droplets of liquid in a gas stream. Example gas streams include coal combustion flue gases (such as from bituminous and sub-bituminous coal types or lignite coal) and syngas streams produced in a coal gasification process.

The terms "sorb," "sorption," and "sorbed," refer to the adsorption, absorption, or other entrapment of the trace contaminant on the sorbent, either physically, chemically, or both physically and chemically.

Trace contaminants to be sorbed include, for instance, contaminants at 3 wt % or less within the fluid stream, for example at 2 wt % or less, or 1 wt % or less.

Trace contaminants may also include, for instance, contaminants at 10,000 $\mu g/m^3$ or less within the fluid stream. Example trace contaminants include metals, including toxic metals. The term "metal" and any reference to a particular metal or other trace contaminant by name herein includes the elemental forms as well as oxidation states of the metal or other trace contaminant. Sorption of a metal thus includes sorption of the elemental form of the metal as well as sorption of any organic or inorganic compound or composition comprising the metal.

Example toxic metals include cadmium, mercury, chromium, lead, barium, beryllium, and chemical compounds or compositions comprising those elements. In one embodiment, the toxic metal is mercury in an elemental ($Hg^o$) or oxidized state ($Hg^+$ or $Hg^{2+}$). Example forms of oxidized mercury include HgO and halogenated mercury, for example $Hg_2Cl_2$ and $HgCl_2$. Other exemplary metallic trace contaminants include nickel, cobalt, vanadium, zinc, copper, manganese, antimony, silver, and thallium, as well as organic or inorganic compounds or compositions comprising them. Additional trace contaminants include arsenic and selenium as elements and in any oxidation states, including organic or inorganic compounds or compositions comprising arsenic or selenium. Volatile organic compounds ("VOCs") are also exemplary trace contaminants.

The trace contaminant may be in any phase that can be sorbed on the flow-through monolithic sorbents. Thus, the trace contaminant may be present, for example, as a liquid in a gas fluid steam, or as a liquid in a liquid fluid stream. The trace contaminant could alternatively be present as a gas phase contaminant in a gas or liquid fluid stream. In one embodiment, the trace contaminant is mercury vapor in a coal combustion flue gas or syngas stream.

Figures 1, 2:
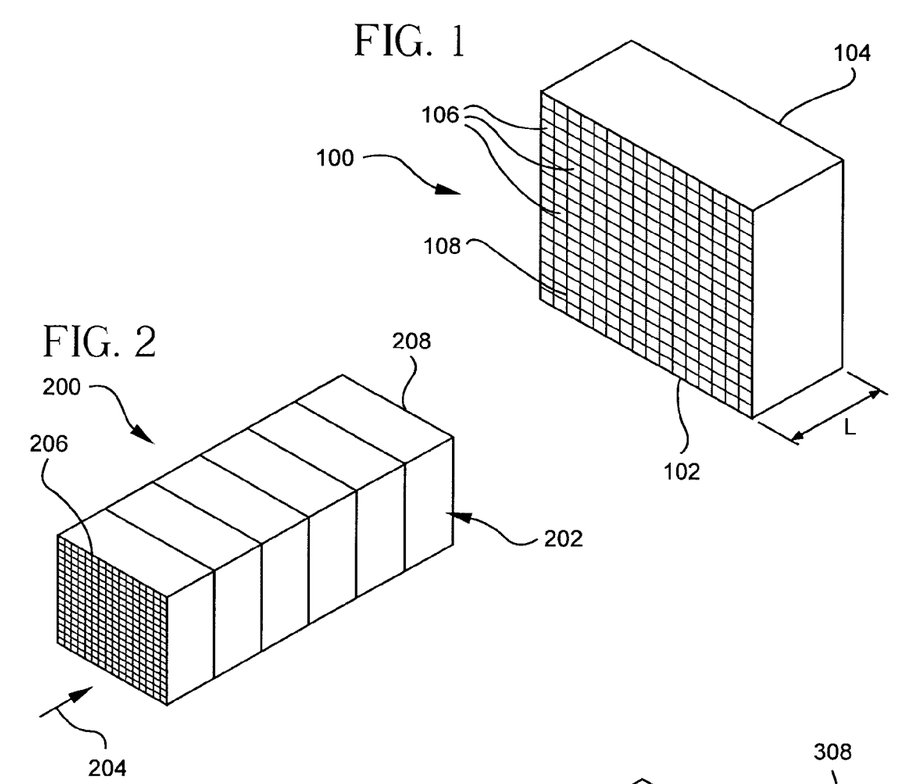
FIG. 1 illustrates an example flow-through monolithic sorbent suitable for the practice of the invention.
FIG. 2 illustrates an example series of honeycomb sorbents suitable for the practice of the invention.

Exemplary flow-through monolithic sorbents include, for example, any monolithic structure comprising channels or porous networks that would permit the flow of a fluid stream through the monolith. FIG. 1 illustrates one example embodiment of a flow-through monolithic sorbent suitable for the practice of the invention. The flow-through monolithic sorbent shown in FIG. 1 is a honeycomb sorbent 100 comprising a length L, an inlet end 102, an outlet end 104, and a multiplicity of cells 106 extending from the inlet end to the outlet end, the cells being defined by intersecting porous cell walls 108. This and other flow-through monolithic sorbents suitable for practice of the invention may be, for example, one to six inches in length. The honeycomb sorbent could optionally comprise one or more selectively plugged honeycomb cell ends to provide a wall flow-through structure that allows for more intimate contact between the fluid stream and cell walls.

The flow-through monolithic sorbents used in embodiments of the invention are positioned in an initial series to allow for passing a fluid stream from an upstream inlet end of the series to a downstream outlet end of the series. In an example illustrated in FIG. 2, series 200 comprises six honeycomb sorbents 202 arranged in series such that a fluid stream 204 can be passed through an upstream inlet end of the series 206 to the downstream outlet end of the series 208. The series may comprise two or more flow-through monolithic sorbents, for instance, the flow-through monolithic series may comprises at least 2, 3, 4, 5, 6, 7, 8, 9, 10, or more flow-through monolithic sorbents such as honeycomb sorbents. In some embodiments, the flow-through monolithic sorbents in the series have the same length. In other embodiments, at least one flow-through monolithic sorbent in the series has a length different from another flow-through monolithic sorbent in the series.

Embodiments of the invention comprise removing an inlet end portion of the flow-through monolithic sorbents from the inlet end position of the series. The inlet end portion of the flow-through monolithic sorbents includes the flow-through monolithic sorbent positioned at the inlet end of the series. The inlet end portion may include two or more flow-through monolithic sorbents, for example, the flow-through monolithic sorbent positioned at the inlet end of the series as well as an adjacent flow-through monolithic sorbent and optionally one or more flow-through monolithic sorbents adjacent to that continuing downstream of the series.

Embodiments of the invention further comprise moving a downstream portion of the flow-through monolithic sorbents from a downstream position in the series to the inlet end position of the series. The downstream portion of the series of flow-through monolithic sorbents includes any flow-through monolithic sorbent positioned downstream of the inlet end of the initial series, and may include the flow-through monolithic sorbent at the outlet end of the initial series.

The downstream portion of the flow-through monolithic sorbents may include two or more flow-through monolithic sorbents, for example a flow-through monolithic sorbent positioned downstream from the inlet end of the series as well as an adjacent flow-through monolithic sorbent and optionally one or more flow-through monolithic sorbents adjacent to that continuing downstream of the series. The downstream portion of the flow-through monolithic sorbents moved to the inlet end position may or may not have the same total length as the total length of flow-through monolithic sorbents removed from the inlet end position of the series. Thus, the downstream portion being moved may ultimately occupy more or less length than that removed from the inlet end portion.

Embodiments of the invention further comprise placing a replacement flow-through monolithic sorbent portion in a downstream position of the series. One or more replacement flow-through monolithic sorbents in the replacement flow-through monolithic sorbent portion are placed in positions in the series previously occupied by one or more flow-through monolithic sorbents in the initial series. The replacement flow-through monolithic sorbent portion may be placed at the end of the series such that it includes the flow-through monolithic sorbent at the outlet end of the resulting series. The replacement flow-through monolithic sorbent portion may include one or more, for example two or more, flow-through monolithic sorbents.

One or more flow-through monolithic sorbents in the replacement honeycomb sorbent portion may have no or essentially no sorbed trace contaminant. Such a flow-through monolithic sorbent may be a new flow-through monolithic sorbent that has not been used in the past for the sorption of a trace contaminant, or may be a flow-through monolithic sorbent that has been regenerated after a previous use for the sorption of a trace contaminant. Alternatively, the replacement flow-through monolithic sorbent portion may include one or more flow-through monolithic sorbents that do have a sorbed trace contaminant. For instance, the replacement flow-through monolithic sorbent portion may include one or more of the flow-through monolithic sorbents that were included in the inlet end portion removed from the inlet end position of the series. A flow-through monolithic sorbent with remaining sorption capacity for a trace contaminant, for example, may be included on its own or together with one or more other flow-through monolithic sorbents in the replacement flow-through monolithic sorbent portion. Such a flow-through monolithic may, for example, have been present in the inlet end portion of the flow-through monolithic sorbents removed from the inlet end position of the series. In other embodiments, the replacement flow-through monolithic sorbent portion does not include any sorbents that were present in the initial series.

The replacement flow-through monolithic sorbent portion may or may not comprise the same total length of flow-through monolithic sorbents as the inlet portion of the flow-through monolithic sorbents removed from the inlet end position of the series. For instance, one embodiment of the invention includes removing 1, 2, or 3 feet of flow-through monolithic sorbents in total length from the inlet end and placing a replacement flow-through monolithic portion of 1, 2, or 3 feet in total length, respectively, in a downstream position of the series. Such a scenario allows for maintaining a certain fixed length of the series. Even when maintaining a certain fixed length of the series, however, one flow-through monolithic sorbent of a length L may be removed from the inlet portion of the series, while two replacement flow-through monolithic sorbents, each of a length of one-half of L, for example, may be positioned downstream in the series.

In some embodiments, the length of the replacement flow-through monolithic sorbent portion is from 10% to 50%, for example, at least 10%, at least 20%, at least 30%, at least 40%, or at least 50%, of the length of the initial series of flow-through monolithic sorbents, which may correspond to the same length of flow-through monolithic sorbents removed from the inlet end position of the series. In further embodiments, the length of the replacement flow-through monolithic sorbent portion is no more than 10% to 50%, for example, no more than 10%, 20%, 30%, 40%, or 50%, of the length of the initial series of flow-through monolithic sorbents, which may correspond to the same length of flow-through monolithic sorbents removed from the inlet end position of the series.

The resulting series of flow-through monolithic sorbents may be arranged such that the concentration of any sorbed trace contaminant, such as a toxic metal, decreases when measured from the inlet end of the series to the outlet end of the series. For instance, the resulting series may be arranged such that the concentration of any sorbed trace contaminant on a sorbent is the same or more than the concentration of the sorbed trace contaminant on an adjacent downstream sorbent. Such an arrangement may be made, for example, by removing the inlet end portion of the initial series, moving the remaining downstream portion of the initial series to the inlet end position while maintaining the relative positions of the flow-through monolithic sorbents with respect to each other in that downstream portion, and placing the replacement flow-through monolithic sorbent portion comprising no or essentially no sorbed trace contaminant at the end of the series.

Any series of flow-through monolithic sorbents may be positioned in any environment appropriate for the practice of the invention. For instance, the series of flow-through monolithic sorbents may be positioned within a duct or any other enclosure carrying the fluid stream such as a combustion flue gas or a syngas. One or more other components, such as a particulate collector, may be positioned within the flow of the fluid stream either upstream or downstream of the series of flow-through monolithic sorbents. For example, an electrostatic precipitator may be placed upstream of the series of flow-through monolithic sorbents.

The flow-through monolithic sorbents may be positioned in series such that there is essentially no space between the outlet end of one flow-through monolithic sorbent and the inlet end of an immediately downstream flow-through monolithic sorbent. The flow-through monolithic sorbents may alternatively be positioned such that one or more of them are separated from an adjacent flow-through monolithic sorbent by a predetermined distance.

A predetermined distance between the flow-through monolithic sorbents in the series may be utilized, for example, to provide greater mixing of the fluid stream and/or a decreased pressure drop across the series. The space between flow-through monolithic sorbents can be of any desirable length, such as from 1 mm to 100 mm, for example from 5 mm to 50 mm.

Any space between flow-through monolithic sorbents may optionally include other materials, such as a packed layer, that may provide, for example, added removal of the trace contaminant from the fluid stream or that may chemically interact with the trace contaminant in the fluid stream. Suitable materials for such a packed layer include, for instance, activated carbon pellets, flyash, cordierite, iron oxide, or aluminum oxide.

The embodiments of the invention may be performed on, for example, one series of flow-through monolithic sorbents used for the sorption of a trace contaminant. The invention also includes, however, managing the use of two or more series of flow-through monolithic sorbents placed in parallel. A parallel configuration includes a flow-through monolithic sorbent series positioned horizontally or vertically with respect to another flow-through monolithic sorbent series.

Figure 3:
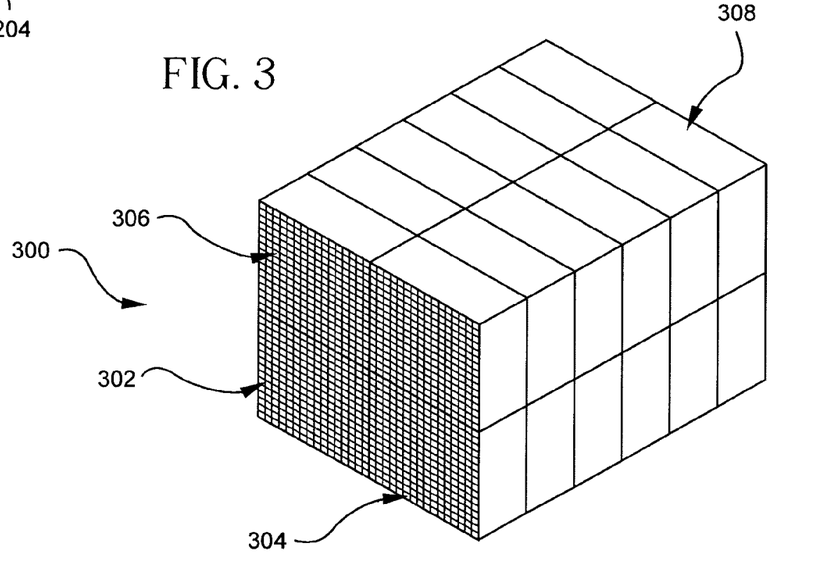
FIG. 3 illustrates four honeycomb sorbent series arranged in parallel with respect to one another.

FIG. 3 illustrates multiple honeycomb sorbent series positioned in a parallel configuration in a stacked matrix of sorbents. Honeycomb sorbent series 302 is in parallel with series 304 positioned horizontally with respect to series 302. FIG. 3 also illustrates honeycomb sorbent series 302 in parallel with series 306 positioned vertically with respect to series 302. Series 308 is also shown in parallel with every other series in the system.

In the embodiment illustrated in FIG. 3, the honeycomb sorbent series are shown positioned such that there is essentially no space between each series. The series may alternatively be positioned such that one or more series is separated from a parallel series by a predetermined distance.

One or more series, for example every series arranged in parallel, may have flow-through monolithic sorbents managed according to the embodiments of the invention. The exchange of flow-through monolithic sorbents in each such series may be performed at approximately the same time or at different times. Thus, one embodiment of the invention includes, for example, removing an inlet end portion from the inlet end position of each series such as shown in FIG. 3, moving downstream portions of the flow-through monolithic sorbents from the same or different downstream positions in each series to the inlet end position of each series, and placing replacement flow-through monolithic sorbent portions in the same or different downstream positions of each series.

Any flow-through monolithic sorbents used according to the invention, whether positioned in series or parallel to one another, can be configured to be non-identical with respect to any one or more physical and/or chemical properties. For example, two or more adjacent or non-adjacent flow-through monolithic sorbents can comprise different monolithic structures, different compositions and, in the case of honeycombs for example, different cell densities, porous channel walls of differing thickness, or cell channels having differing sizes or cross-sectional geometries. Exemplary cell geometries for honeycomb sorbents can include circular, square, triangular, rectangular, hexagonal, sinusoidal, or any combination thereof. Adjacent or non-adjacent honeycombs may also be positioned such that the cells of the honeycombs are offset from one another. Such a configuration may promote a splitting of fluid streams from the cells of one honeycomb sorbent into two or more cells of another honeycomb sorbent in the series.

To assist in the removal, movement, or replacement of flow-through monolithic sorbents in a series, one or more flow-through monolithic sorbents may be positioned in the same or different cassettes that can hold the sorbents. The cassettes may be provided with rollers, bearings, or tracks that may assist in conveying the cassettes (and flow-through monolithic sorbents that they hold) into, through, and out of the series of flow-through monolithic sorbents. The cassettes may, for example, have a length corresponding to the length of the flow-through monolithic sorbent being carried or greater.

After a period of use, one or more flow-through monolithic sorbents within the series may become spent such that they no longer can provide a desired level of sorption efficiency for the trace contaminant. To this end, one or more trace contaminant detectors or sensors may be positioned anywhere within the series or near or at the outlet end of the series to detect levels of the trace contaminant. The detectors or sensors can provide feedback indicating a concentration of trace contaminant in the fluid stream at any given point within the series or near or at the outlet end of the series. In an exemplary embodiment, a suitable mercury sensor can be a continuous detection mercury analyzer manufactured by PS Analytical (Model PSA 10.680) or by Nippon Instruments (Model DM-6).

Accordingly, when the concentration of a trace contaminant in the fluid stream exceeds a predetermined level, being indicative of an sorption efficiency at or below certain standards, flow-through monolithic sorbents may be exchanged using the techniques of described above. The feedback from the detectors or sensors may also be utilized to select the appropriate length of flow-through monolithic sorbents to be exchanged.

The series of flow-through monolithic sorbents may be exchanged according to any appropriate time schedule. For instance, such an exchange may be made once a year during a yearly power plant outage for maintenance. Furthermore, the series of flow-through monolithic sorbents may be modified with or without discontinuing the fluid stream supply to the series.

The flow-through monolithic sorbents may be of any composition, structure, and dimensions suitable for the practice of the invention. One or all of the flow-through monolithic sorbents may be in the form of honeycomb sorbents. One or all flow-through monolithic sorbents may comprise activated carbon, for example, one or all of the flow-through monolithic sorbents may have continuous activated carbon bodies, with or without additional materials included in the activated carbon matrix. In other embodiments, one or more flow-through monolithic sorbents comprise a coating that sorbs the trace contaminant. Such sorbents may be, for example, a glass, glass-ceramic, ceramic, or metal honeycomb coated with, for instance, activated carbon or other sorbent.

The flow-through monolithic sorbents, such as activated carbon-containing sorbents, may further comprise sulfur and/or a catalyst that catalyzes the sorption of the trace contaminant from the fluid stream. The sulfur and/or catalyst may be present in the batch mixture used to form the flow-through monolithic sorbents, or may be coated onto a sorbent that has already been formed, for example using a wash-coating technique. The term "sulfur" includes both elemental sulfur and sulfur in any oxidation state, including chemical compounds and compositions that comprise sulfur.

EXAMPLE 1

FIGS. 4A-4E illustrate various embodiments of the invention.

Figure 4A:
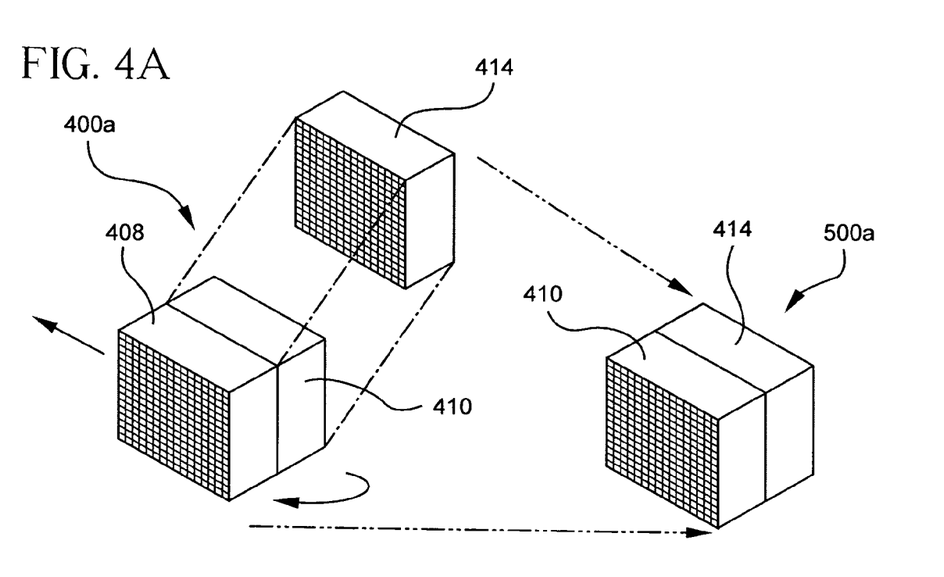
FIGS. 4A-4E illustrate several example embodiments of the invention.
Figure 4B:
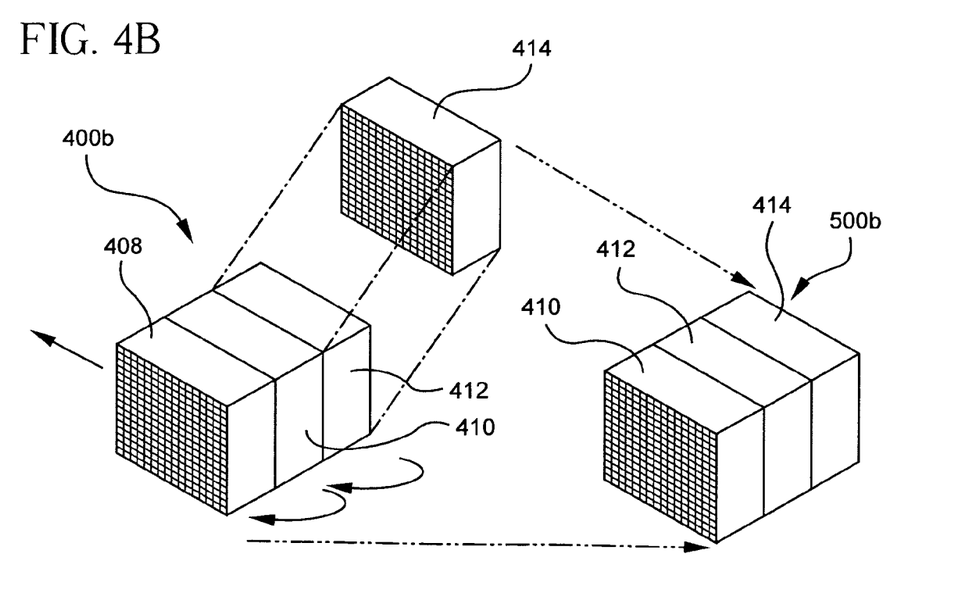
Figure 4C:
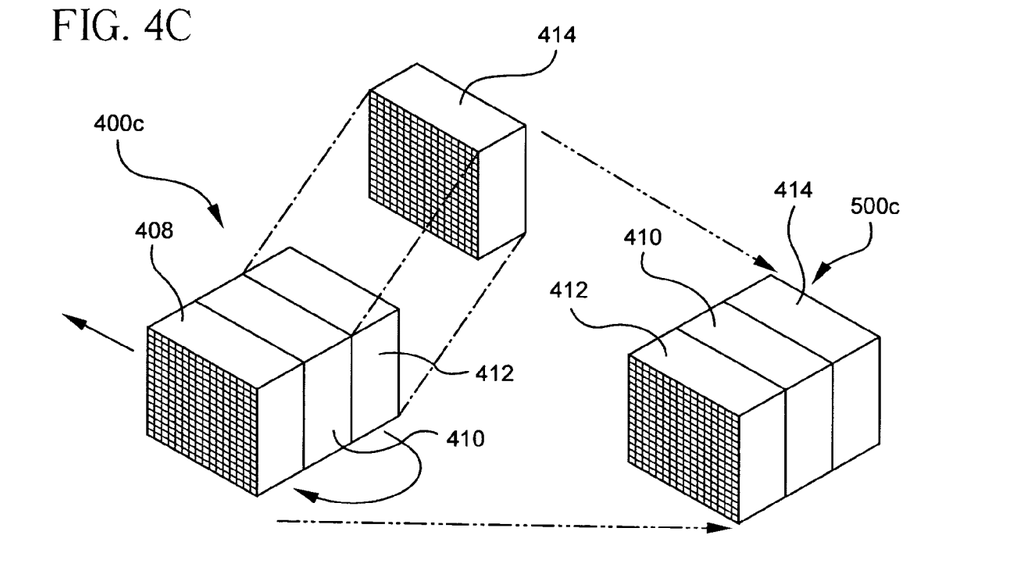
Figure 4D:
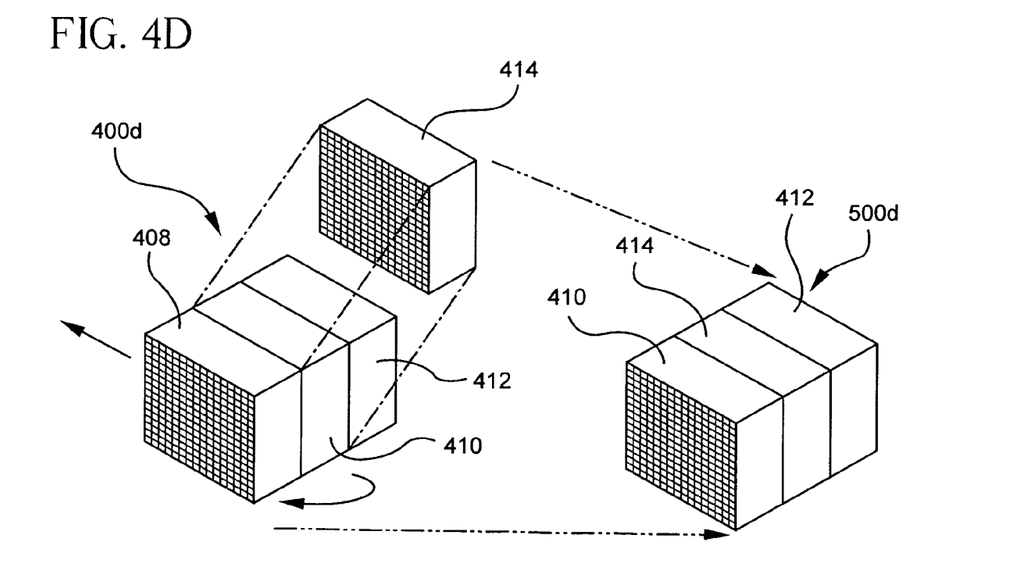
Figure 4E:
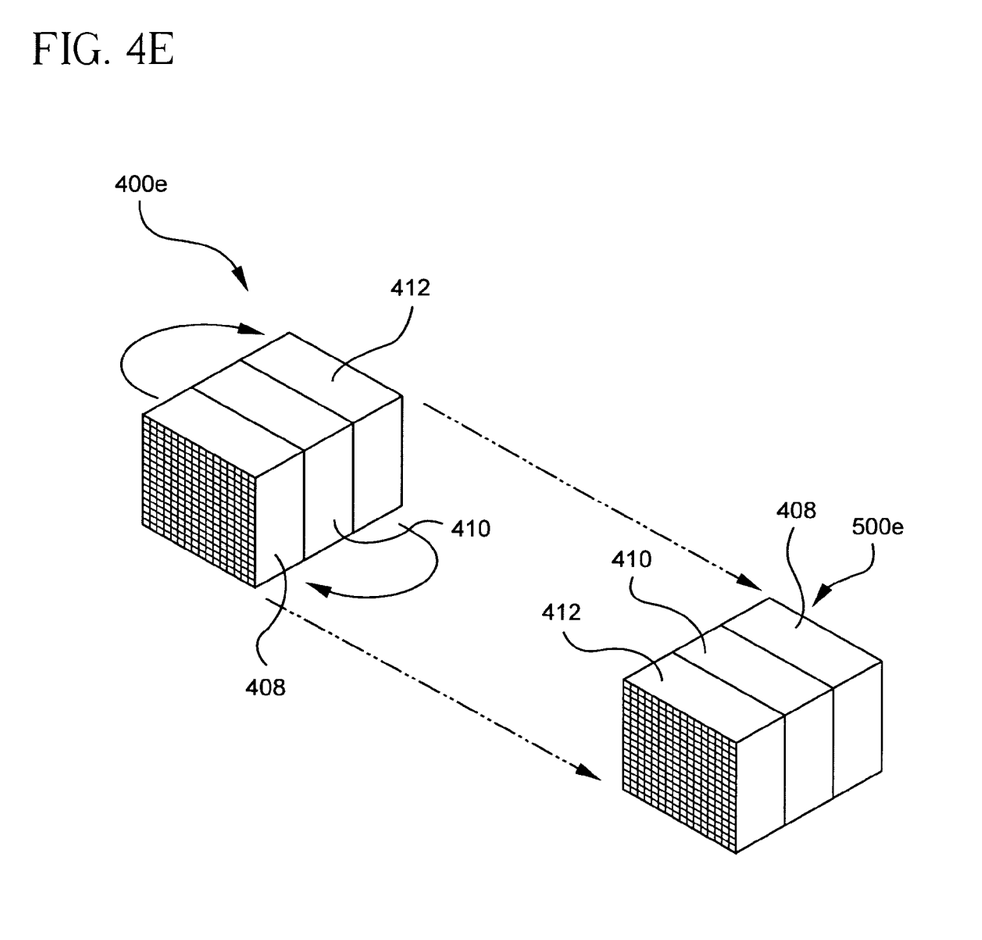

FIG. 4A illustrates an initial series of honeycomb sorbents 400a comprising an inlet end portion 408 and a downstream portion 410 of the honeycomb sorbents in the series having inlet end face shown. A replacement honeycomb portion 414 is added to the series as the inlet end portion 408 is removed and the downstream portion 410 is moved to the inlet end position, resulting in a new series of honeycomb sorbents 500a.

FIGS. 4B, 4C, 4D and 4E illustrate additional embodiments of the invention showing an exchange of honeycomb sorbents from initial series 400b, 400c, 400d and 400e to a resulting series 500b, 500c, 500d and 500e, respectively. Each initial series comprises an inlet end portion 408 removed from the inlet end position, as a downstream portion 410 and/or 412 is moved to the inlet end position and a replacement portion 408 or 414 is added to a downstream position of the series.

EXAMPLE 2

Honeycomb sorbents of a certain length (for example, each 1-6 inches) are assembled in a cassette which is 6 inches in length and has a width and height of several feet. Several such cassettes are assembled to create a three feet or longer honeycomb sorbent series.

At the end of one year of exposure to a fluid stream comprising mercury, the first one foot of the honeycomb series, or first two cassettes, are saturated with mercury while the last two feet have sorbed a low concentration of mercury. During the annual replacement, only the first two cassettes are removed, the next four cassettes are moved forward toward the inlet end of the series and two cassettes comprising fresh honeycomb sorbents are positioned downstream at the outlet end position of the series. The cycle is then repeated periodically, for example once per year.

It should be understood that while the invention has been described in detail with respect to certain illustrative embodiments thereof, it should not be considered limited to such, as numerous modifications are possible without departing from the broad spirit and scope of the invention as defined in the appended claims.

We claim:

1. A method for managing the use of flow-through monolithic sorbents for the sorption of a trace contaminant from a fluid stream, which comprises:
    providing two or more flow-through monolithic sorbents having a trace contaminant sorbed thereon, wherein the flow-through monolithic sorbents are positioned in an initial series to allow for passing a fluid stream from an upstream inlet end of the series to a downstream outlet end of the series;
    removing an inlet end portion of the flow-through monolithic sorbents from the inlet end position of the series;
    moving a downstream portion of the flow-through monolithic sorbents from a downstream position in the series to the inlet end position of the series; and
    placing a replacement flow-through monolithic sorbent portion in a downstream position of the series, wherein the replacement flow-through monolithic sorbent portion is separate from the two or more flow-through monolithic sorbents prior to placement in the downstream position of the series.

2. The method of claim 1, wherein the trace contaminant is a metal.

3. The method of claim 1, wherein the trace contaminant is selected from cadmium, mercury, chromium, lead, barium, beryllium, arsenic and selenium.

4. The method of claim 3, wherein the trace contaminant is mercury in an elemental or oxidized state.

5. The method of claim 1, wherein the replacement flow-through monolithic sorbent portion comprises one or more sorbents having no or essentially no sorbed trace contaminant.

6. The method of claim 1, wherein the replacement flow-through monolithic sorbent portion comprises one or more flow-through monolithic sorbents removed from the inlet end position of the series.

7. The method of claim 1, wherein the replacement flow-through monolithic sorbent portion comprises the same total length of flow-through monolithic sorbents as the inlet portion of the flow-through monolithic sorbents removed from the inlet end position of the series.

8. The method of claim 1, wherein the length of the replacement flow-through monolithic sorbent portion is from 10% to 50% of the length of the initial series of flow-through monolithic sorbents.

9. The method of claim 1, wherein one or more flow-through monolithic sorbents comprise activated carbon.

10. The method of claim 1, wherein one or more flow-through monolithic sorbents comprise sulfur and/or a catalyst that catalyzes the sorption of the trace contaminant from the fluid stream.

11. The method of claim 1, wherein one or more flow-through monolithic sorbents are honeycomb sorbents.

12. A method for managing the use of flow-through monolithic sorbents for the removal of a trace contaminant from a fluid stream, which comprises:
    passing a fluid stream comprising a trace contaminant through an upstream inlet end of an initial series of two or more flow-through monolithic sorbents to a downstream outlet end of the series to sorb a trace contaminant in the series of flow-through monolithic sorbents; and
    periodically modifying the series of flow-through monolithic sorbents by a modification method comprising:
    removing an inlet end portion of the flow-through monolithic sorbents from the inlet end position of the series;
    moving a downstream portion of the flow-through monolithic sorbents from a downstream position in the series to the inlet end position of the series; and
    placing a replacement flow-through monolithic sorbent portion in a downstream position of the series, wherein the replacement flow-through monolithic sorbent portion is separate from the two or more flow-through monolithic sorbents prior to placement in the downstream position of the series.

13. The method of claim 12, wherein the trace contaminant is a metal.

14. The method of claim 12, wherein the trace contaminant is selected from cadmium, mercury, chromium, lead, barium, beryllium, arsenic and selenium.

15. The method of claim 14, wherein the trace contaminant is mercury in an elemental or oxidized state.

16. The method of claim 12, wherein the fluid stream is selected from a coal combustion flue gas and a syngas stream.

17. The method of claim 12, which comprises periodically modifying the series of flow-through monolithic sorbents approximately once per year.

18. The method of claim 12, wherein one or more flow-through monolithic sorbents comprise activated carbon.

19. The method of claim 12, wherein one or more flow-through monolithic sorbents comprise sulfur and/or a catalyst that catalyzes the sorption of the trace contaminant from the fluid stream.

20. The method of claim 12, wherein one or more flow-through monolithic sorbents are honeycomb sorbents.

* * * * *